US012574718B2

(12) United States Patent
Srivastava et al.

(10) Patent No.: US 12,574,718 B2
(45) Date of Patent: Mar. 10, 2026

(54) FACILITATING RADIO ACCESS NETWORK SHARING FOR A MULTI-OPERATOR CORE NETWORK ENVIRONMENT

(71) Applicant: Cisco Technology, Inc., San Jose, CA (US)

(72) Inventors: Vimal Srivastava, Karnataka (IN); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 526 days.

(21) Appl. No.: 18/296,566

(22) Filed: Apr. 6, 2023

(65) Prior Publication Data

US 2024/0340630 A1     Oct. 10, 2024

(51) Int. Cl.
*H04W 8/08*        (2009.01)
*H04W 16/14*       (2009.01)

(52) U.S. Cl.
CPC ............. *H04W 8/08* (2013.01); *H04W 16/14* (2013.01)

(58) Field of Classification Search
CPC ................................ H04W 8/08; H04W 16/14
See application file for complete search history.

(56) References Cited

U.S. PATENT DOCUMENTS

2018/0262978 A1     9/2018  Kahn et al.
2020/0059983 A1*    2/2020  Stauffer ............ H04W 36/0066
2020/0322780 A1    10/2020  Lauster
2021/0029603 A1     1/2021  Kim et al.
2021/0243686 A1     8/2021  Baek et al.
2022/0303935 A1     9/2022  Olsson et al.
2023/0102300 A1*    3/2023  Faccin .................. H04W 76/10
                                                    455/435.1
2024/0314657 A1*    9/2024  Krishnan ........ H04W 36/00698
2025/0184881 A1*    6/2025  Olvera-Hernandez .....................
                                                    H04L 67/51

(Continued)

OTHER PUBLICATIONS

3GPP, "New study on network sharing in 5GS," 3GPP SA WG1 Meeting #97e, Rel-19, S1-220013r-45, Feb. 2022, 5 pages.

(Continued)

*Primary Examiner* — Dai Phuong
(74) *Attorney, Agent, or Firm* — Edell, Shapiro & Finnan, LLC

(57)                    ABSTRACT

Provided herein are techniques to facilitate radio access network sharing for a Multi-Operator Core Network (MOCN) environment. In one instance, a method may include obtaining, by a radio node of a shared RAN, home mobile network identifiers that are associated with a home access and mobility management function (AMF) in which the home mobile network identifiers are obtained from a first transit AMF that include first priority values and from a second transit AMF that include second priority values. The method may further include obtaining a control plane communication from a user equipment (UE) including a particular home mobile network identifier, identifying the first transit AMF or the second transit AMF that is associated with a highest priority value for the particular home mobile network identifier; and transmitting the communication to the identified transit AMF that is to proxy control plane communications between the UE and the home AMF.

20 Claims, 8 Drawing Sheets

(56)                    References Cited

U.S. PATENT DOCUMENTS

2025/0203447 A1*   6/2025  Qiao ..................... H04W 76/27

OTHER PUBLICATIONS

3GPP, "5G; System Architecture for the 5G System (3GPP TS 23.501 version 15.3.0 Release 15)," ETSI TS 123 501 V15.3.0, Technical Specification, Sep. 2018, 227 pages.
3GPP, "3rd Generation Partnership Project; Technical Specification Group Services and System Aspects; System architecture for the 5G System (5GS); Stage 2 (Release 18)," 3GPP TS 23.501 V18.1.0, Mar. 2023, 667 pages.
3GPP, "3rd Generation Partnership Project; Technical Specification Group Services and System Aspects; Procedures for the 5G System (5GS); Stage 2 (Release 17)," 3GPP TS 23.502 V17.8.0, Mar. 2023, 748 pages.
3GPP, "3rd Generation Partnership Project; Technical Specification Group Services and System Aspects; System architecture for the 5G System (5GS); Stage 2 (Release 17)," 3GPP TS 23.501 V17.8.0, Mar. 2023, 572 pages.
3GPP, "3rd Generation Partnership Project; Technical Specification Group Services and System Aspects; Procedures for the 5G System (5GS); Stage 2 (Release 18)," 3GPP TS 23.502 V18.1.1, Apr. 2023, 829 pages.

* cited by examiner

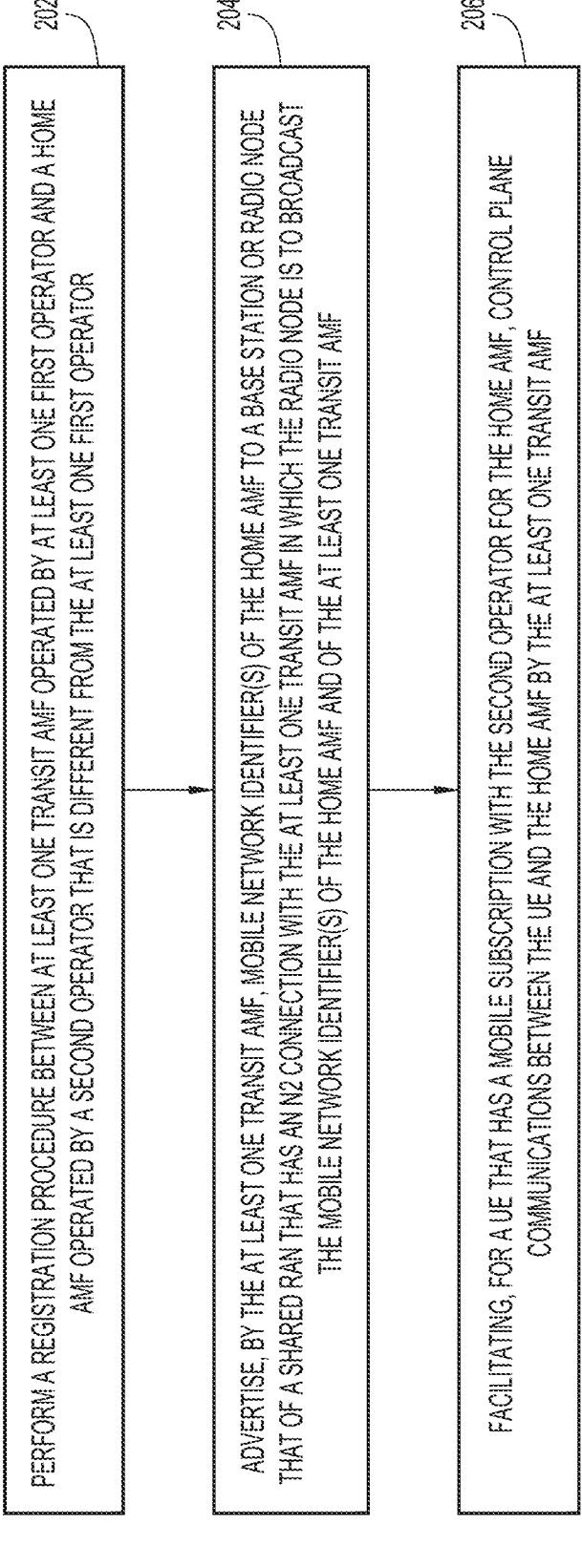

PERFORM A REGISTRATION PROCEDURE BETWEEN AT LEAST ONE TRANSIT AMF OPERATED BY AT LEAST ONE FIRST OPERATOR AND A HOME AMF OPERATED BY A SECOND OPERATOR THAT IS DIFFERENT FROM THE AT LEAST ONE FIRST OPERATOR

202

ADVERTISE, BY THE AT LEAST ONE TRANSIT AMF, MOBILE NETWORK IDENTIFIER(S) OF THE HOME AMF TO A BASE STATION OR RADIO NODE THAT OF A SHARED RAN THAT HAS AN N2 CONNECTION WITH THE AT LEAST ONE TRANSIT AMF IN WHICH THE RADIO NODE IS TO BROADCAST THE MOBILE NETWORK IDENTIFIER(S) OF THE HOME AMF AND OF THE AT LEAST ONE TRANSIT AMF

204

FACILITATING, FOR A UE THAT HAS A MOBILE SUBSCRIPTION WITH THE SECOND OPERATOR FOR THE HOME AMF, CONTROL PLANE COMMUNICATIONS BETWEEN THE UE AND THE HOME AMF BY THE AT LEAST ONE TRANSIT AMF

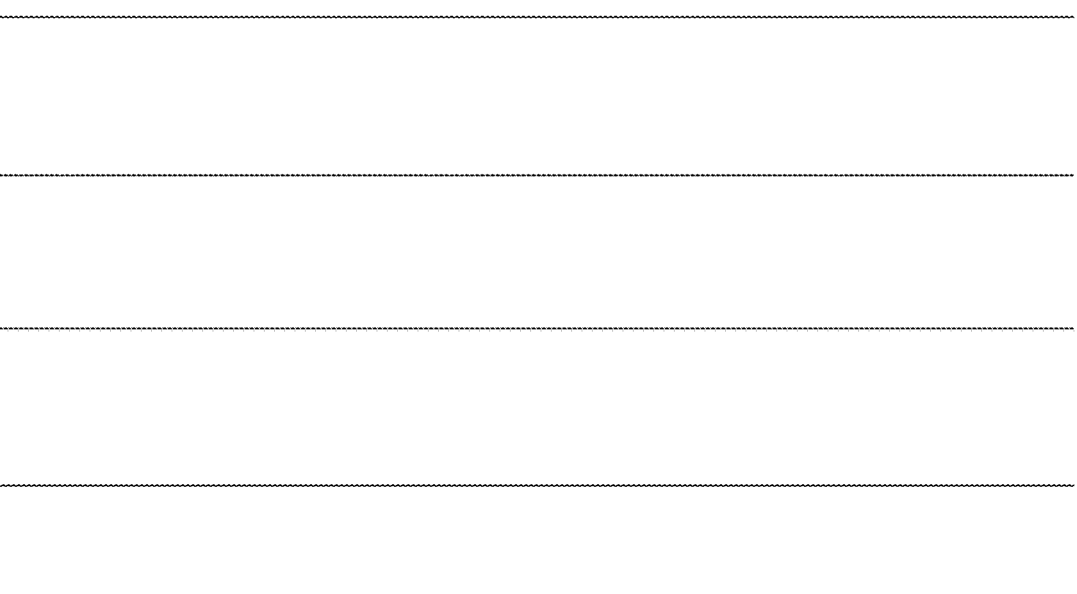
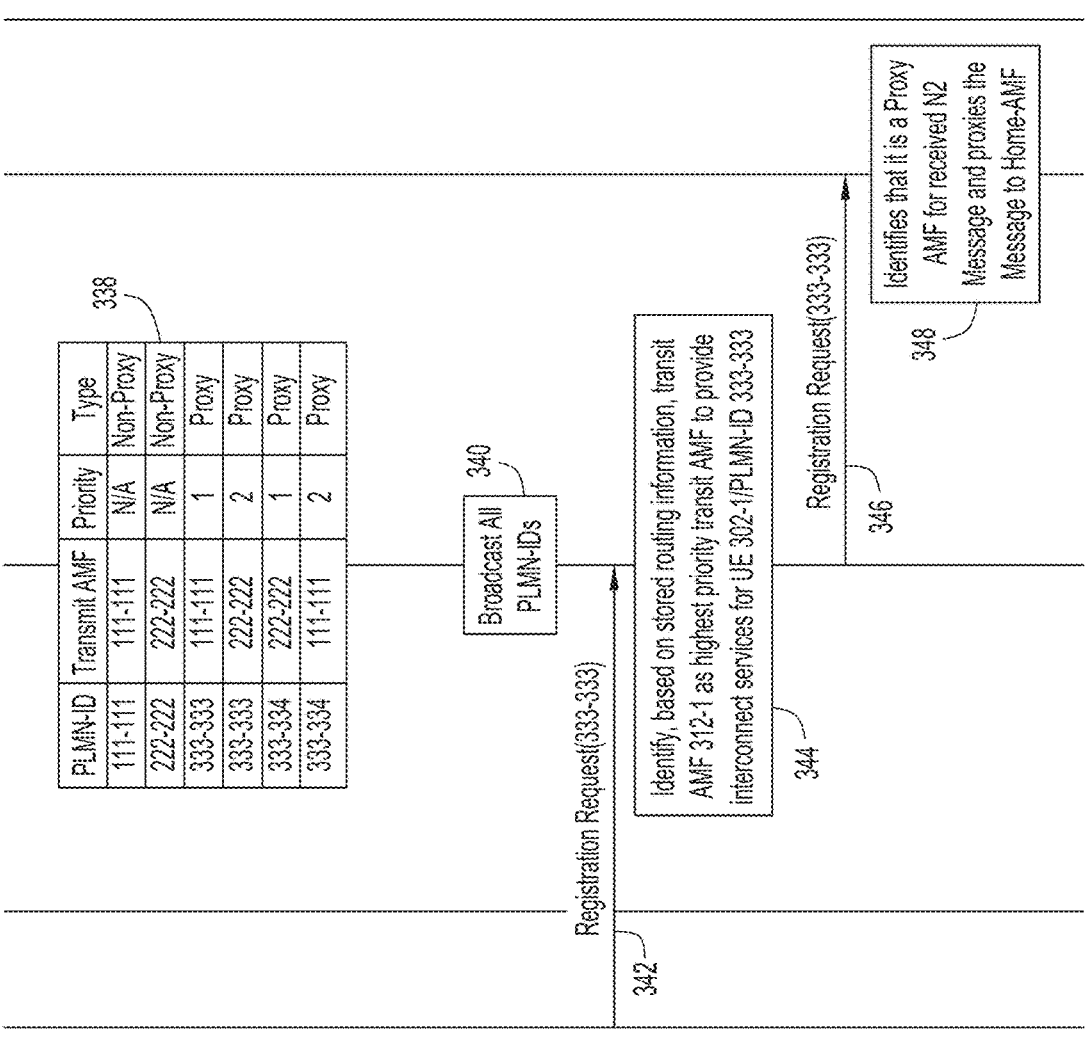
FIG.3B

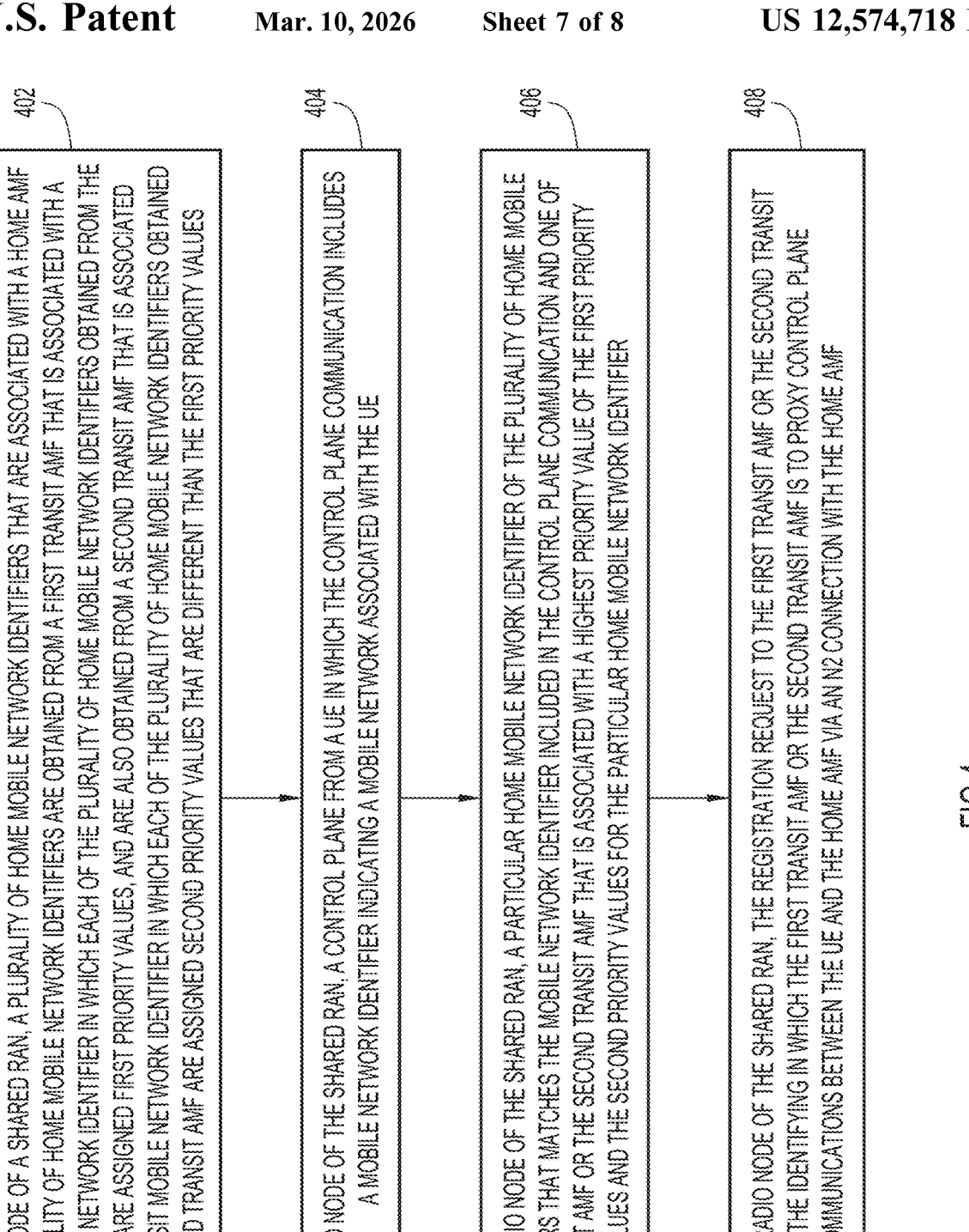

400

402

OBTAIN, BY A RADIO NODE OF A SHARED RAN, A PLURALITY OF HOME MOBILE NETWORK IDENTIFIERS THAT ARE ASSOCIATED WITH A HOME AMF IN WHICH THE PLURALITY OF HOME MOBILE NETWORK IDENTIFIERS ARE OBTAINED FROM A FIRST TRANSIT AMF THAT IS ASSOCIATED WITH A FIRST TRANSIT MOBILE NETWORK IDENTIFIER IN WHICH EACH OF THE PLURALITY OF HOME MOBILE NETWORK IDENTIFIERS OBTAINED FROM THE FIRST TRANSIT AMF ARE ASSIGNED FIRST PRIORITY VALUES, AND ARE ALSO OBTAINED FROM A SECOND TRANSIT AMF THAT IS ASSOCIATED WITH A SECOND TRANSIT MOBILE NETWORK IDENTIFIER IN WHICH EACH OF THE PLURALITY OF HOME MOBILE NETWORK IDENTIFIERS OBTAINED FROM THE SECOND TRANSIT AMF ARE ASSIGNED SECOND PRIORITY VALUES THAT ARE DIFFERENT THAN THE FIRST PRIORITY VALUES

404

OBTAIN, BY THE RADIO NODE OF THE SHARED RAN, A CONTROL PLANE FROM A UE IN WHICH THE CONTROL PLANE COMMUNICATION INCLUDES A MOBILE NETWORK IDENTIFIER INDICATING A MOBILE NETWORK ASSOCIATED WITH THE UE

406

IDENTIFY, BY THE RADIO NODE OF THE SHARED RAN, A PARTICULAR HOME MOBILE NETWORK IDENTIFIER OF THE PLURALITY OF HOME MOBILE NETWORK IDENTIFIERS THAT MATCHES THE MOBILE NETWORK IDENTIFIER INCLUDED IN THE CONTROL PLANE COMMUNICATION AND ONE OF THE FIRST TRANSIT AMF OR THE SECOND TRANSIT AMF THAT IS ASSOCIATED WITH A HIGHEST PRIORITY VALUE OF THE FIRST PRIORITY VALUES AND THE SECOND PRIORITY VALUES FOR THE PARTICULAR HOME MOBILE NETWORK IDENTIFIER

408

TRANSMIT, BY THE RADIO NODE OF THE SHARED RAN, THE REGISTRATION REQUEST TO THE FIRST TRANSIT AMF OR THE SECOND TRANSIT AMF BASED ON THE IDENTIFYING IN WHICH THE FIRST TRANSIT AMF OR THE SECOND TRANSIT AMF IS TO PROXY CONTROL PLANE COMMUNICATIONS BETWEEN THE UE AND THE HOME AMF VIA AN N2 CONNECTION WITH THE HOME AMF

FACILITATING RADIO ACCESS NETWORK SHARING FOR A MULTI-OPERATOR CORE NETWORK ENVIRONMENT

TECHNICAL FIELD

The present disclosure relates to network equipment and services.

BACKGROUND

Networking architectures have grown increasingly complex in communication environments. In particular, mobile communication networks have grown substantially as end users become increasingly connected to mobile network environments. As the number of mobile users increases, efficient management of communication resources becomes more critical.

BRIEF DESCRIPTION OF THE DRAWINGS

FIG. 2 is a flowchart depicting a method according to an example embodiment.

FIGS. 3A, 3B, 3C, and 3D are a message sequence diagram illustrating various operations involving another system that may facilitate RAN sharing for a MOCN environment, according to an example embodiment.

FIG. 4 is a flowchart depicting another method according to an example embodiment.

DETAILED DESCRIPTION

Overview

Figure 1:
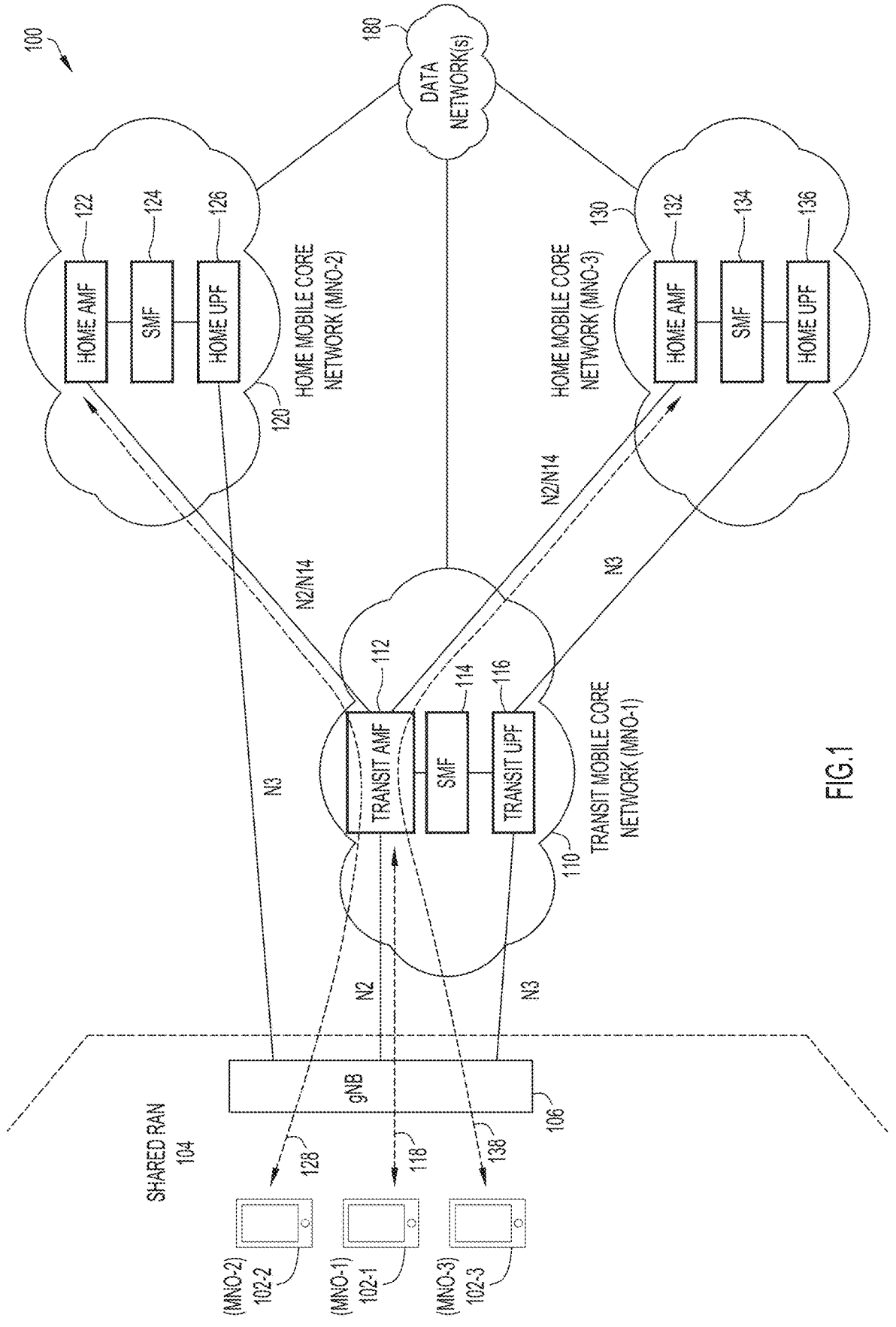
FIG. 1 is a block diagram of a system that may facilitate radio access network (RAN) sharing for a multi-operator core network (MOCN) environment, according to an example embodiment.

Provided herein are techniques through which radio access network (RAN) sharing may be facilitated for a Multi-Operator Core Network (MOCN) environment (e.g., a Third Generation Partnership Project (3GPP) MOCN environment) in which a direct N2 link may not be available/provided between one or more home mobile network operators (MNOs) and shared RAN elements (e.g., shared base stations or radio nodes), but rather one or more transmit MNOs are instead connected to the shared RAN nodes such that the transit MNOs can provide transit services via corresponding transit core network functions in order to facilitate control plane communication exchanges and/or, in some instances user plane communication exchanges, between user equipment (UE) in the shared RAN and the home MNOs.

In at least one embodiment, a transit MNO may provide/operate at least one transit Access and Mobility Management Function (AMF) in which the transit AMF is connected to a RAN element (e.g., a base station, such as a gNodeB) of the shared RAN and the transit AMF is further connected to a home AMF that is operated by a home MNO. The transit AMF can facilitate an N2 connection to the home AMF such that UEs in the shared RAN can interact with the home AMF via the transit AMF for various communications, such as control plane communications. Thus, the transit AMF may be considered a proxy AMF to proxy communications between the UEs and the home AMF. In at least one embodiment, a transit MNO may also provide/operate at least one transit User Plane Function (UPF) in which the transit UPF is connected to a RAN element of the shared RAN and the transit UPF is further connected to a home UPF operated by a home MNO such that UEs in the shared RAN can interact with the home UPF via the transit UPF for various data plane communications.

In at least one embodiment, multiple transit AMFs can be provided/operated by different transit MNOs. In such an embodiment, a given home AMF operated by a given home MNO may perform a registration procedure with each transit AMF to establish priorities for which each transit AMF is to perform transit services for each of one or more mobile network identifiers (e.g., public land mobile network (PLMN) identifiers (IDs)) of the home AMF/home MNO. The mobile network identifiers and corresponding priorities can be advertised to a RAN element of the shared RAN (e.g., a base station, such as a gNodeB) such that when a UE seeks to register with the home AMF/MNO and provides a corresponding subscription identifier through the registration that includes a mobile network identifier (e.g., via an International Mobile Subscriber Identity (IMSI) for the UE, a Subscription Permanent Identifier (SUPI) for the UE (contained in a Subscription Concealed Identifier (SUCI)), etc. in which a PLMN-ID is included in the IMSI or SUCI/SUPI), the RAN element can identify and select a corresponding transit AMF that is to handle registration communications between the UE and the home AMF. In one instance, the RAN element can transmit a registration request received from the UE to the selected transit AMF, in which the transit AMF is to facilitate registration communications between the UE and the home AMF via an N2 connection with the home AMF.

In at least one embodiment, a computer-implemented method is provided that may include obtaining, by a radio node of a shared radio access network (RAN), a plurality of home mobile network identifiers that are associated with a home access and mobility management function (AMF), the plurality of home mobile network identifiers being obtained from: a first transit AMF that is associated with a first transit mobile network identifier, wherein each of the plurality of home mobile network identifiers obtained from the first transit AMF are assigned first priority values; and a second transit AMF that is associated with a second transit mobile network identifier, wherein each of the plurality of home mobile network identifiers obtained from the second transit AMF are assigned second priority values that are different than the first priority values. The method may further include obtaining, by the radio node of the shared RAN, a control plane communication from a user equipment (UE), wherein the control plane communication includes a mobile network identifier indicating a mobile network associated with the user equipment; identifying, by the radio node of the shared RAN, a particular home mobile network identifier of the plurality of home mobile network identifiers that matches the mobile network identifier included in the control plane communication and one of the first transit AMF or the second transit AMF that is associated with a highest priority value of the first priority values and the second priority values for the particular home mobile network identifier; and transmitting, by the radio node of the shared RAN, the control plane communication to the first transit AMF or the second transit AMF based on the identifying, wherein the first transit AMF or the second transit AMF is to proxy control plane communications between the UE and the home AMF.

Example Embodiments

A Multi-Operator Core Network (MOCN) or a Gateway Core Network (GWCN) architecture may provide network sharing for mobile network architectures. In particular, a MOCN architecture may include functionality that allows a first mobile network operator (MNO) to provide access to other MNOs to a radio access network (RAN), which can be owned and/or operated by the first MNO or can be owned/operated by a RAN operator.

In such a MOCN mobile network architecture, each MNO operates its own mobile core network (e.g., control plane and data plane network functions (NFs)) but the RAN (e.g., RAN elements or base stations, such as gNodeBs, within the RAN) are shared among all the MNOs—the first MNO and the other MNOs. The GWCN architecture extends the sharing principle by including additional nodes for sharing, such as a mobile switching server (MSC), a serving General Packet Radio Service (GPRS) Support Node (SGSN), or a Mobility Management Entity (MME). There are also alternatives for network sharing that can be based on Third Generation Partnership Project (3GPP) roaming architectures and/or wireless local area network (WLAN) (e.g., Wi-Fi) architectures, such as OpenRoaming architectures.

A challenge with the MOCN architecture involves the operational complexity of interconnections between the shared RAN elements and the core network elements/NFs of the other MNO's mobile core networks. When there are large number of shared base stations, the complexity of these interconnections can increase by orders of magnitude with the number of other MNOs sharing the base stations. Thus, it would be advantageous to develop a new sharing model in which a RAN (elements within the RAN) can be shared with multiple core network operators but without involving any direct connections between the shared RAN elements and the core networks of the other participating operators. The 3GPP standard-setting organization is currently studying this problem.

In accordance with embodiments herein, various techniques are provided through which network sharing can be facilitated in which at least one (transit) MNO provides transit interconnect services via a transit mobile core network to one or more other (home) MNOs/home mobile core networks such that direct interconnections are not involved between a shared RAN and the one or more other (home) MNOs/home mobile core networks. Direct interconnections for the shared RAN will instead be terminated in the transit mobile core network of the at least one transit MNO. Core network function(s) of the transit mobile core network that terminate connections with the shared RAN can, in turn, connect to similar RAN-associated elements (e.g., a home Access and Mobility Management Function (AMF) and, in some instances, a home User Plane Function (UPF)) of the one or more other home MNOs/home mobile core networks.

As referred to herein, the terms "transit" or "proxy" can be used to represent a mobile core network/mobile core network function that can have a direct interconnection with one or more radio nodes of a shared RAN and the term "home" can be used to represent a mobile core network/mobile core network function that does not have a direct interconnection with the one or more radio nodes of the shared RAN, but rather which is connected to a transit/proxy mobile core network/mobile core network function that is further interconnected with the one or more radio nodes of the shared RAN.

To enable such a configuration, in at least one embodiment, a transit Access and Mobility Management Function (AMF) within the transit mobile core network operated by the transit MNO can have a direct interconnection with a base station of the shared RAN. The transit AMF can be enhanced to support proxy-AMF interconnection services such that the transit AMF can further interconnect with a home AMF of the one or more other home MNOs that do not have a direct interconnection with the base station of the shared RAN.

Referring to FIG. 1, FIG. 1 is a block diagram of a system 100 that may facilitate radio access network (RAN) sharing for a multi-operator core network (MOCN), according to an example embodiment, in which the RAN sharing can be provided without direct RAN interconnects with one or more home mobile core networks. System 100 may include a number of wireless devices, such as a user equipment (UE) 102-1, a UE 102-2, and a UE 102-3, and may also include a shared Radio Access Network (RAN) 110, and a number of mobile core networks, including a transit mobile core network 110 and a number of home mobile core networks, including a home mobile core network 120, a home mobile core network 130. In at least one embodiment, shared RAN 104 may include a base station or radio node, such as a gNB 106 (sometimes referred to as a gNodeB). Also shown in FIG. 1 are data network(s) 180.

Each mobile core network can include a number of core network functions or elements can be characterized as being owned and/or operated by a corresponding mobile network operator (MNO). For example, transit mobile core network 110 can include a number of core network functions, such as at least a transit Access and Mobility Management Function (AMF) a Session Management Function (SMF) 114, and a transit User Plane Function (UPF) 116 in which transit mobile core network 110 (and functions provided thereby) can be owned/operated by a particular MNO, shown in FIG. 1 as 'MNO-1'. Home mobile core network 120 can also include a number of core network functions, such as at least a home AMF 122, an SMF 124, and a home UPF 126 in which home mobile core network 120 (and functions provided thereby) can be owned/operated by a particular MNO, shown in FIG. 1 as 'MNO-2'. Home mobile core network 130 can also include a number of core network functions, such as at least a home AMF 132, an SMF 134, and a home UPF 136 in which home mobile core network 130 (and functions provided thereby) can be owned/operated by a particular MNO, shown in FIG. 1 as 'MNO-3'.

Each of MNO-1, MNO-2, and MNO-3 are considered different mobile network operators. For the embodiment of FIG. 1, consider that UE 102-1 is operated by a user/subscriber that has a mobile subscription with MNO-1, that UE 102-2 is operated by a user/subscriber that has a mobile subscription with MNO-2, and that UE 102-3 is operated by a user/subscriber that has a mobile subscription with MNO-3.

In some embodiments, shared RAN 104 can be owned/operated by MNO-1, however, in other embodiments, shared RAN 104 can be owned/operated by a RAN operator that can have a MOCN transit sharing agreement with MNO-1 that provides transit interconnect services to other MNOs, such as MNO-2 and MNO-3, as shown for the embodiment of FIG. 1.

It is to be understood that the mobile core network functions illustrated for the mobile core networks of FIG. 1 are provided for illustrative purposes only and are not meant to limit the broad scope of embodiments herein. Other network functions can be provided for each core network in accordance with any appropriate core network standards, such as 3GPP standards and/or the like.

Generally, per-3GPP standards, an AMF interfaces with an SMF, the SMF can further interface with one or more UPFs, and the AMF and UPF(s) can each further interface with one or more gNBs of a RAN.

However, embodiments herein provide that a transit AMF and a transit UPF of a transit mobile core network can directly interconnect with each of one or more base stations or radio nodes of a shared RAN. Further, embodiments herein provide that, rather than being directly interconnected with a base station or radio node of the shared RAN, a home AMF of a home mobile core network can instead interconnect with a transit AMF that provides proxy-AMF services to the home AMF.

For the embodiment of FIG. 1, transit mobile core network 110 can be interconnected with home mobile core network 120 and home mobile core network 130. As illustrated for the embodiment of FIG. 1, transit AMF 112 of transit mobile core network 110 is interconnected with gNB 106 of shared RAN 104. Transit AMF 112 is further interconnected with home AMF 122 of home mobile core network 120 and is further interconnected with home AMF 132 of home mobile core network 130 in accordance with the MOCN architecture provided by embodiments herein.

Each of transit mobile core network 110, home mobile core network 120, and home mobile core network 130 are further interconnected with data network(s) 180. For example, although not shown in FIG. 1, each of transit UPF 116, home UPF 126, and home UPF 136 can interface with data network(s) 180.

In some embodiments, rather than being directly interconnected with a base station or radio node of the shared RAN, a home UPF of a home mobile core network can instead interconnect with a transit UPF of a transit mobile core network. However, in some embodiments a home UPF may have a direct N3 tunnel with a base station or radio node of the shared RAN. Thus, different home UPF<->shared RAN or home UPF<->transit UPF<->shared RAN interconnection configurations can be facilitated in accordance with various embodiments herein.

For example, home UPF 126 may have a direct N3 tunnel with gNB 106 and home UPF 136 may be interconnected with transit UPF 116, which may further be interconnected with gNB 106 (rather than home UPF 136 having a tunnel with gNB 106) in various embodiments. Thus, different home UPF<->shared RAN or home UPF<->transit UPF<->shared RAN interconnection configurations can be facilitated in accordance with various embodiments herein.

Generally, shared RAN 104 may include any combination of one or more 3GPP 5G/nG (next Generation) gNodeB or gNB, such as gNB 106 and/or 3GPP 4G/LTE evolved node Bs (eNodeBs or eNBs), not shown, to facilitate network connectivity between one or more UEs and corresponding mobile core networks. A gNodeB/eNodeB, such as gNB 102, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for shared RAN 104 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, such as shared RAN 104, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more UEs, may utilize to connect to shared RAN 104 for one or more sessions (e.g., voice, video, data, gaming, combinations thereof, etc.) with a corresponding mobile core network.

A gNB, such as gNB 106 and/or any other gNBs discussed herein can be enhanced to facilitate additional operations in accordance with various embodiments herein.

A wireless device, such as any of UE 102-1, 102-2, 102-3, and any other UEs discussed herein, may be considered any electronic device, etc. that initiates a connection or communication session with a corresponding mobile core network, such as a computer, a mobile phone or mobile communication device, an electronic tablet, a laptop, etc. an electronic device such as an industrial device (e.g., a robot), automation device, enterprise device, appliance, Internet of Things (IoT) device (e.g., sensor, monitor, meter (parking meter, gas meter, water meter, etc.), traffic light, camera/surveillance device, smart device, etc.), a router with a WWA/WLA interface, a WWA/WLA (cellular/Wi-Fi®) enabled device. and/or any other device, component, element, or object capable of initiating voice, audio, video, media, or data exchanges within system 100. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, such as gNB 106 of shared RAN 104, for one or more sessions with a corresponding mobile core network, such as mobile network.

Generally, an AMF may facilitate access and mobility management control/services for one or more UEs. A transit AMF, such as transit AMF 112 and/or any other transit AMFs discussed herein can be enhanced to facilitate additional operations in accordance with various embodiments herein.

Generally, an SMF, such as SMF 114 (and any other SMFs discussed herein) may be responsible for wireless device session management, with individual functions/services being supported on a per-session basis in order to facilitate data transfer(s) between a UE and one or more data network(s) 180 via one or more UPFs. Generally, a UPF may operate to provide packet routing and forwarding operations for user data traffic and may also perform a variety of functions such as packet inspection, traffic optimization, QoS, policy enforcement and user data traffic handling (e.g., to/from one or more data network(s) 180), and billing operations (e.g., accounting, etc.) for UE sessions. A transit UPF, such as transit UPF 116 and/or any other transit AMFs discussed herein can be enhanced to facilitate additional operations in accordance with various embodiments herein. In various embodiments, the data network(s) 180 may include be any combination of the Internet, a gaming network, an IP Multimedia Subsystem (IMS), an Ethernet data network (not shown), Ethernet switching system(s) (not shown), an enterprise network managed/operated by an enterprise entity, and/or the like.

Broadly during operation of various embodiments herein, the transit mobile core network 110 can provide RAN interconnect services for home mobile core network 120 (operated by MNO-2) and home mobile core network 130 (operated by MNO-3). In some embodiments, shared RAN 104 can be owned/operated by MNO-1, however, in other embodiments, shared RAN 104 can be owned/operated by a RAN operator that can have a MOCN transit sharing agreement with MNO-1 that provides transit interconnect services (e.g., via transit AMF 112) to other MNOs, such as MNO-2 and MNO-3, as shown for the embodiment of FIG. 1.

As shown in FIG. 1, interconnections from the shared RAN 104, such as a 3GPP N2 connection with gNB 106 will terminate on the transit AMF 112 in the transit MNO-1's transit mobile core network 110.

For the embodiment of FIG. 1, it is assumed that MNO-1 will have a transit AMF sharing agreement with each of MNO-2 and MNO-3 to provide proxy interconnect services as discussed herein. Through a registration procedure performed with each of home AMF 122 of home mobile core network 120 and home AMF 132 of home mobile core network 130, the transit AMF 112 can establish a corresponding N2 connection with each of home AMF 122 and home AMF 132 in order to bridge the corresponding N2 connections from the shared RAN 104 (e.g., from gNB 106) to each of home AMF 122 and home AMF 132. Through the registration procedure, the transit AMF 112 will also extend corresponding 3GPP N14 interfaces with each of home AMF 122 and home AMF 132 in order to bridge/facilitate UE Non-Access Stratum (NAS) or other control plane communications to be forwarded between each corresponding home AMF 122/132 and UE(s) registering/establishing sessions with each corresponding home mobile core network 120/130.

Through the registration procedure, each of home AMF 122 and home AMF 132 can provide mobile network identifier(s), such as Public Land Mobile Network (PLMN) identifiers (IDs), for that are configured for each of home AMF 122/home mobile core network 120 and home AMF 132/home mobile core network 130. A PLMN-ID includes a 3-digit Mobile Country Code (MCC) and a 2- or 3-digit Mobile Network Code (MNC), formatted in an 'MCC-MNC' format, such as 'XXX-YYY' (for a 3-digit MNC).

Following the registration procedure with each of home AMF 122 and home AMF 132, the transit AMF can register with the shared RAN 104/gNB 106 as an explicit proxy advertising its transit services. For example, the transit AMF 112 can advertise each mobile network identifier (e.g., PLMN-ID) obtained from each of home AMF 122 and home AMF 132 (via the registration procedure with each home AMF 122/132) to gNB 106 such that, along with mobile network identifier(s) (e.g., PLMN-ID(s)) for transit AMF 112/transit mobile core network 110, the gNB 106 can also broadcast (e.g., via System Information Block (SIB) broadcasts per 3GPP standards) mobile network identifiers (e.g., PLMN-IDs) for each of home AMF 122/home mobile core network 120 and home AMF 132/home mobile core network 130 such that any UE(s) having subscriptions with any of the mobile core networks (transit or home) can seek registration/session establishment with an appropriate mobile core network/MNO.

The gNB 106 stores an association between the (home) PLMN-ID(s) for each of home AMF 122/home mobile core network 120 and home AMF 132/home mobile core network 130 and the (transit) PLMN-ID(s) that is/are utilized by/configured for transit AMF 112/transit mobile core network 110. The association stored by the gNB 106 enables the gNB 106 to identify the corresponding home AMFs/home mobile core networks that are served by the transit AMF 112 such that the gNB 106 can direct any registration/NAS communications that are intended for each home AMF/home mobile core network to the transit AMF, which can bridge/proxy the communications to the appropriate home AMF/home mobile core network. Additional features regarding transit/home PLMN-IDs that can be stored by a gNB and utilized to facilitate various additional operations are discussed in further detail herein, below.

Consider an example in which transit AMF 112/transit mobile core network 110 utilizes a PLMN-ID of '111-111', home AMF 122/home mobile core network 120 utilizes a PLMN-ID of '222-222', and home AMF 132/home mobile core network 130 utilizes a PLMN-ID of '333-333'. In this example, TABLE 1, below, illustrates an example PLMN-ID routing information data structure or table that can be stored by gNB 106.

TABLE 1

| PLMN-ID | Transit AMF | Type |
|---------|-------------|------|
| 111-111 | 111-111 | Non-Proxy |
| 222-222 | 111-111 | Proxy |
| 333-333 | 111-111 | Proxy |

As shown in TABLE 1, gNB 106 can store PLMN-ID '111-111' in association with the PLMN-ID '111-111' that is utilized by transit AMF 112/transit mobile core network 110 in further association with an AMF 'Type' identifier indicating that transit AMF 112 is the originating/non-proxy AMF for the PLMN-ID '111-111' (e.g., is not perform proxy interconnect services for the PLMN-ID).

Further as shown in TABLE 1, gNB 106 can store PLMN-ID '222-222' in association with PLMN-ID '111-111' that utilized by transit AMF 112/transit mobile core network 110 in further association with an AMF 'Type' identifier indicating that transit AMF 112 is a proxy/transit AMF for the PLMN-ID '222-222', such that the AMF 112 is to perform proxy interconnect services for any UEs seeking registration/NAS communications with PLMN-ID '222-222'.

Further as shown in TABLE 1, gNB 106 can store PLMN-ID '333-333' in association with PLMN-ID '111-111' that is utilized by transit AMF 112/transit mobile core network 110 in further association with an AMF 'Type' identifier indicating that transit AMF 112 is a proxy/transit AMF for the PLMN-ID '333-333', such that the AMF 112 is to perform proxy interconnect services for any UEs seeking registration/NAS communications with PLMN-ID '333-333'.

It is to be understood that the example transit/home PLMN-ID routing information data structure or table illustrated in TABLE 1 is provided for illustrative purposes only and is not meant to limit the broad scope of embodiments herein. Any other variations and/or additional information can be stored in such a data structure/table in accordance with embodiments herein. For example, in some embodiments, as discussed in further detail herein, below, multiple transit AMFs may be provided for a communication system and multiple PLMN-IDs can be utilized by a home AMF/home mobile core network such that priority indications for different transit AMFs/PLMN-IDs can be utilized by a gNB in order to determine an appropriate transit AMF to which to forward registration/NAS communications for one or more UEs.

Also as shown in FIG. 1, transit UPF 116 will terminate a 3GPP N3 connection with gNB 106. In some embodiments, transit UPF 116 can facilitate extending/bridging the N3 interconnection with a home UPF, such as home UPF 136 of home mobile core network 130. However, in some embodiments, a home UPF can terminate an N3 connection directly with a shared RAN, such as home UPF 126 for home mobile core network 120 terminating an N3 connection with gNB 106, as shown in FIG. 1.

Further during operation of FIG. 1, when a given UE seeks registration with a corresponding mobile core network with which the UE has a subscription, various operations can be performed. Considering an example in which UE 102-1 seeks registration with transit mobile core network 110, the UE 102-1 can transmit an N2 registration request message toward gNB 106 that includes a subscription identifier for UE 102-1, such an International Mobile Subscriber Identity (IMSI) for the UE 102-1 or a Subscription Permanent Identifier (SUPI) (contained in a Subscription Concealed Identifier (SUCI)) for the UE 102-1, that includes the PLMN-ID with which the UE 102-1 seeks registration, such as '111-111' as discussed for the example of TABLE 1. Utilizing the stored association as discussed for TABLE 1, gNB 106 can identify that transit AMF 112 utilizing PLMN-ID '111-111' is the AMF to which the registration is to be forwarded and, further, that transit AMF 112 will not perform proxy interconnect services for the UE 102-1 (control plane) communications (e.g., Type=Non-Proxy). Based on the identification, gNB 106 forwards the registration request to transit AMF 112 and registration between the transit AMF 112/transit mobile core network 110 and UE 102-1 can be performed following 3GPP standards-based registration procedures (e.g., 3GPP Technical Specification (TS) 23.502, etc.), as generally shown at 118.

However, if UE 102-2 seeks registration with home mobile core network 120, the UE 102-2 can transmit an N2 registration request message toward gNB 106 that includes a subscription identifier for UE 102-2 (e.g., IMSI, SUCI/SUPI, etc.). Upon obtaining the registration request, the gNB 106 can identify the PLMN-ID with which UE 102-2 seeks registration, such as '222-222' as discussed for the example of TABLE 1. Utilizing the stored association as discussed for TABLE 1, gNB 106 can further identify that the transit AMF 112 utilizing PLMN-ID '111-111' is the AMF to which the registration request is to be forwarded and, further, that transit AMF 112 will perform proxy interconnect services for the UE 102-2 (control plane) communications (e.g., Type=Proxy). Based on the identification, gNB 106 forwards the registration request to transit AMF 112, which further proxies the registration request toward home AMF 122 and registration between the home AMF 122/home mobile core network 120 and UE 102-2 following 3GPP standards-based registration procedures, as generally shown at 128, with transit AMF proxying the control plane communications between UE 102-2 and home AMF 122.

Similarly, if UE 102-3 seeks registration with home mobile core network 130, the UE 102-3 can transmit an N2 registration request message toward gNB 106 that includes a subscription identifier for UE 102-3 (e.g., IMSI, SUCI/SUPI, etc.). Upon obtaining the registration request, the gNB 106 can identify the PLMN-ID with which UE 102-3 seeks registration, such as '333-333' as discussed for the example of TABLE 1. Utilizing the stored association as discussed for TABLE 1, gNB 106 can further identify that the transit AMF 112 utilizing PLMN-ID '111-111' is the AMF to which the registration request is to be forwarded and, further, that transit AMF 112 will perform proxy interconnect services for the UE 102-3 communications (e.g., Type=Proxy). Based on the identification, gNB 106 forwards the registration request to transit AMF 112, which further proxies the registration request toward home AMF 132 and registration between the home AMF 132/home mobile core network 130 and UE 102-3 following 3GPP standards-based registration procedures, as generally shown at 138, with transit AMF proxying the control plane communications between UE 102-2 and home AMF 122.

As noted above, in some embodiments multiple transit AMFs can be provided via multiple corresponding transit mobile core networks/MNOs. In such embodiments, a given home AMF can provide priority information along with mobile network identifiers (PLMN-IDs) to each of a given transit AMF with which a registration procedure is performed. A given transit AMF (with which the home AMF registers) can, in turn, register with the shared RAN (gNB(s)) as an explicit proxy and advertise its transit services to the shared RAN/gNB(s) along with priority factors or values obtained from the home AMF for that given transit network.

Each transit AMF can perform such registration with the shared RAN/gNB(s) such that, when a UE latches onto the shared RAN/a given gNB, the gNB can perform a lookup on its transit/home PLMN-ID association data structure/table to identify a corresponding transit AMF to which to forward a registration request for the UE based not only on the PLMN-ID of the UE and the PLMN-ID of the home AMF and association to a given PLMN-ID of a corresponding transit AMF, but also on a priority level that is associated with each corresponding transit AMF. By considering priority, the gNB can identify and select a transit AMF having a highest priority for to proxy interconnect services for the home AMF, assuming the highest priority transit AMF is available/reachable (e.g., not experiencing a failure, not overloaded, etc.), and the gNB can forward the registration request to the selected transit AMF. However, for instances in which the highest priority transit AMF is not available/unreachable, the gNB can identify and select the next highest priority or lower priority transit AMF to serve as the transit AMF for the home AMF.

Thus, broadly, operations that can be provided by system 100 (or any other systems discussed for embodiments herein) to facilitate RAN sharing without direct RAN interconnects/N2 links for home mobile core networks in a MOCN environment can include, but not be limited to, registering, by one or more home AMF(s) with one or more transit AMF(s) in order to enable proxy functionality on the transit AMF(s) for the home AMF(s). The registration can include various proxy criteria for each home AMF, such as PLMN-ID(s) for each home AMF, as well as, in some embodiments, priority information associated with each PLMN-ID that can be used to influence transit AMF selection by a gNB for MOCN environments involving multiple transit AMFs/transit MNOs.

Following registration, the transit AMF(s) can inform gNB(s) of the shared RAN that a given transit AMF is acting as a transit/proxy AMF for other (home) MNOs, such that the shared RAN (gNB(s)) can be configured with mobile network identifier(s) (PLMN-ID(s)) of corresponding home AMF(s) for which interconnect services are provided by corresponding transit AMF(s) (and priority information, in some embodiments), so that UE(s) can latch on to the shared RAN/gNB(s) in order to register/connect with the mobile core network with which the UE(s) have a mobile subscription.

On receiving a control plane message from a given UE, a gNB in the shared RAN can forward the N2 packets to the transit AMF that has registered at the gNB for the PLMN-ID of the UE and the transit AMF can, for instances in which the transit AMF is providing proxy interconnect services for a home AMF utilizing the PLMN-ID of the UE, proxy the control plane communications between the UE and the corresponding home AMF.

Further, as noted above, the shared RAN can support different user plane connections, such as a direct N3 tunnel with a given home UPF or an N3 tunnel with a transit UPF of a transit mobile core network in which the transit UPF can bridge N3 user plane communications between a given UE and a corresponding home AMF.

Accordingly, the new network sharing approach provided by embodiments herein can enable new business models and may be useful in MOCN environments.

Referring to FIG. 2, FIG. 2 is a flowchart depicting a method according to an example embodiment. In at least one embodiment, method 200 may be associated with techniques that may be utilized to facilitate RAN sharing in a MOCN without involving direct RAN interconnections for one or more home mobile core networks, according to an example embodiment. In various embodiments, method 200 may be performed by a computing device or combination of computing devices as discussed for embodiments herein, such as transit AMF 112 and gNB 106 of FIG. 1 or any other transit AMF/gNB of any other embodiments discussed herein.

At 202, the method may include performing a registration procedure between at least one transit AMF operated by at least one first operator and a home AMF operated by a second operator that is different from the at least one first operator (e.g., performing a registration procedure between home AMF 122 and transit AMF 112). In at least one embodiment, a transit AMF can be configured with identifying information of a home AMF (e.g., Internet Protocol (IP) address, Fully Qualified Domain Name (FQDN), etc.) and can initiate the registration procedure with the home AMF, or vice-versa (e.g., initiated by the home AMF utilizing identifying information for a transit AMF). During the registration procedure, the home AMF can provide mobile network identifier(s), such as PLMN-ID(s), of the home AMF/a home mobile core network of the second operator (e.g., PLMN-ID(s) served by the home AMF/the home mobile core network).

In some embodiments, such as embodiments in which multiple transit AMFs may be provided for a MOCN environment, the home AMF can include priority level information or factors for each of multiple mobile network identifiers served by the home AMF in the information provided to the at least one transit AMF during the registration procedure.

At 204, the method may include advertising, by the at least one transit AMF, mobile network identifier(s) (e.g., PLMN-ID(s)) of the home AMF to a base station or radio node that of a shared RAN that has an N2 connection with the at least one transit AMF in which the radio node is to broadcast the mobile network identifier(s) of the home AMF and of the at least one transit AMF. The home AMF does not have an N2 connection with the radio node of the shared RAN.

At 206, the method may include facilitating, for a mobile device or UE that has a mobile subscription with the second operator for the home AMF, control plane communications between the UE and the home AMF by the at least one transit AMF. In at least one embodiment, the control plane communications proxied by the at least one transit AMF can include registration communications between the UE and the home AMF that enable to UE to establish a connection with the home mobile core network of the second operator.

In at least one embodiment, operations at 206 may include obtaining a registration request from the UE by the base station and the base station identifying a particular transit AMF that is to perform proxy interconnect services for the home AMF based, at least in part, on the mobile network identifier of the home AMF. In at least one embodiment, identifying a particular transit AMF that is to perform proxy interconnect services for the home AMF can be based additionally on priority level information for the particular transit AMF (e.g., the particular transit AMF is identified as a highest priority transit AMF to provide RAN interconnect services for the home AMF)

With reference to FIGS. 3A, 3B, 3C, and 3D are a message sequence diagram illustrating example operations 300 involving another system that may facilitate RAN sharing for a MOCN environment, according to an example embodiment. The system of FIGS. 3A, 3B, 3C, and 3D includes a UE 302-1, a UE 302-2, a gNB 306 (of a shared RAN, not shown in FIGS. 3A-3D), a transit AMF 312-1, a transit AMF 312-2, a transit UPF 316-1, a transit UPF 316-2, a home AMF 322, and a home UPF 326.

For the embodiment of FIGS. 3A-3D, consider that home AMF 322 and home UPF 326 are core network functions of a home mobile core network (not shown in FIGS. 3A-3D) operated/owned by a home MNO that has a sharing agreement with two transit MNOs operating transit mobile core networks that each operate a corresponding transit mobile core network in which a first transit mobile core network (not shown in FIGS. 3A-3D) operated by a first transit MNO includes transit AMF 312-1 and transit UPF 316-1 that are both directly interconnected with gNB 306 and in which a second transit mobile core network (not shown in FIGS. 3A-3D) operated by a second transit MNO includes transit AMF 312-2 and transit UPF 316-2 that are both directly interconnected with gNB 306. Further for the embodiment of FIGS. 3A-3D, consider that the home transit AMF 322 can be interconnected with each of transit AMF 312-1 and transit AMF 312-2; thus, home AMF 322 does not have direct interconnections with gNB 306. Further for the embodiment of FIGS. 3A-3D, consider that home UPF 326 can be interconnected with each of transit UPF 316-1 and transit UPF 316-2; thus, home UPF 326 does not have direct interconnections with gNB 306.

For the embodiment of FIGS. 3A-3D, consider that home AMF is configured with/serves two PLMN-IDs, '333-333' and '333-334' that are configured the home mobile core network of the home MNO, that UE 302-1 has a mobile subscription with the home MNO for PLMN-ID '333-333', and that UE 302-2 has a mobile subscription with the home MNO for PLMN-ID '333-334'. Further for the embodiment of FIGS. 3A-3D, consider that the first transit mobile core network operated by the first transit MNO is configured with a PLMN-ID '111-111' utilized by transit AMF 312-1/transit UPF 316-1 and consider that the second transit mobile core network operated by the second transit MNO is configured with a PLMN-ID '222-222' utilized by/configured for transit AMF 312-2/transit UPF 316-2.

For the operations of FIGS. 3A-3D, consider, as shown at 330a, that the first transit MNO operating transit AMF 312-1 has a transit AMF sharing agreement with the home MNO operating home AMF 322 such that the first transit MNO has agreed to provide shared RAN interconnect services for the home MNO and as shown at 330b that the second transit MNO operating transit AMF 312-2 also has transit AMF sharing agreement with the home MNO operating home AMF 322 such that the second transit MNO has also agreed to provide shared RAN interconnect services for the home MNO.

As shown at 332a, a registration procedure can be performed between transit AMF 312-1 and home AMF 322 that involves a request/response messaging exchange. For example, transit AMF 312-1 may transmit a registration request message to home AMF 322 to which the home AMF 322 can respond with a registration response message that include the PLMN-IDs configured for the home AMF 322/ the home mobile core network along with a priority value that is assigned to each PLMN-ID. In one embodiment, home AMF 322 can assign priority values to PLMN-IDs for which proxy services are to be provided by a given transit AMF based on configuration, load balancing, geographical/ tracking area/coverage area considerations, sharing agreement considerations with a transit MNO, and/or the like. For the embodiment of FIGS. 3A-3D, consider that for transit AMF 312-1, that PLMN-ID '333-333' is assigned a priority value of '1' (indicating a highest priority) and that PLMN-ID '333-334' is assigned a priority value of '2' (indicating a next highest or lower priority compared to the priority value of '1') such that transit AMF 312-1 can store transit routing information for the PLMN-IDs based on their assigned priority values, as generally shown at 334a.

As shown at 332b, a registration procedure can be performed between transit AMF 312-2 and home AMF 322 that can also involve a request/response messaging exchange. For example, transit AMF 312-2 may transmit a registration request message to home AMF 322 to which the home AMF 322 can respond with a registration response message that include the PLMN-IDs configured for the home AMF 322/ the home mobile core network along with a priority value that is assigned to each PLMN-ID. For the embodiment of FIGS. 3A-3D, consider that for transit AMF 312-2, that PLMN-ID '333-334' is assigned a priority value of '1' (indicating a highest priority) and that PLMN-ID '333-333' is assigned a priority value of '2' (indicating a next highest or lower priority compared to the priority value of '1') such that transit AMF 312-2 can store transit routing information for the PLMN-IDs based on their assigned priority values, as generally shown at 334b.

At 336a, transit AMF 312-1 advertises the transit routing information obtained from home AMF 322 to gNB 306, including the PLMN-IDs and corresponding priority values and an indication that transit AMF 312-1 is providing proxy interconnect services for the PLMN-IDs (e.g., providing a Proxy Indicator flag, bit, etc. along with each PLMN-ID and corresponding priority value, potentially signaled as Attribute-Value-Pair (AVP) objects, Type-Length-Value (TLV) objects, or the like, such as '333-333/1' and '333-334/2', for example). In one embodiment, the operations at 336a can be performed via AMF configuration update/acknowledgment signaling performed between the transit AMF 312-2 and the gNB 306.

At 336b, transit AMF 312-2 advertises the transit routing information obtained from home AMF 322 to gNB 306, including the PLMN-IDs and corresponding priority values and an indication that transit AMF 312-2 is providing proxy interconnect services for the PLMN-IDs (e.g., 'Proxy Indication', '333-334/1', '333-333/2'). In one embodiment, the operations at 336b can be performed via AMF configuration update/acknowledgment signaling performed between the transit AMF 312-2 and the gNB 306.

Following each of transit AMF 312-1 and transit AMF 312-2 advertising their corresponding transit routing information, PLMN-ID routing information can be stored at gNB 306 via a corresponding data structure or table, as shown at 338 for FIG. 3B, that indicates various PLMN-ID information, transit AMF information, priority information, and AMF Type information, which is shown below in TABLE 2.

TABLE 2

| PLMN-ID | Transit AMF | Priority | Type |
|---------|-------------|----------|------|
| 111-111 | 111-111 | N/A | Non-Proxy |
| 222-222 | 222-222 | N/A | Non-Proxy |
| 333-333 | 111-111 | 1 | Proxy |
| 333-333 | 222-222 | 2 | Proxy |
| 333-334 | 222-222 | 1 | Proxy |
| 333-334 | 111-111 | 2 | Proxy |

For the PLMN-ID routing information shown in TABLE 2 (and at 338), no priority information is indicated for the PLMN-IDs for each corresponding transit mobile core network/transit AMF for which transit interconnect services are not to be provide by each transit AMF for its own corresponding PLMN-ID. However, priority values corresponding to those provided by the home AMF 322 through registration with each transit AMF 312-1 and 312-2 are shown in TABLE 2 in in association with the corresponding home PLMN-IDs '333-333' and '333-334'.

Further for FIG. 3B, gNB 306 broadcasts all the PLMN-IDs for the home mobile core network, as well as for each transit mobile core network, for example, '111-111', '222-222', '333-333', and '333-334', as generally shown at 340

As shown at 342, consider that UE 302-1, upon recognizing PLMN-ID '333-333' being broadcast by the gNB 306 initiates registration with the home MNO/home mobile core network by transmitting a registration request message to the gNB 306 that includes the PLMN-ID '333-333' within an IMSI or SUCI/SUPI included in the registration request. As shown at 344, gNB 306 identifies, based on the stored routing information, that transit AMF 312-1 is to provide interconnect services for UE 302-1/PLMN-ID '333-'333' or, stated differently, that transit AMF 312-1 is to facilitate control plane proxy communications between UE 302-1 and home AMF 322 for PLMN-ID '333-333' by matching the PLMN-ID '333-333' presented by the UE 302-1 via the registration request to the corresponding PLMN-ID '333-333' stored in the routing information table 338 that identifies transit AMF 312-1 corresponding to the first transit MNO PLMN-ID of '111-111' as being the highest priority ('1') proxy/transit AMF to provide transit interconnect services for the PLMN-ID '333-333' indicated by UE 302-1. Based on the identification at 344, gNB 306 transmits the registration request to transit AMF 312-1, as shown at 346. Based on the routing information configured at transit AMF 312-1 via the registration procedure with home AMF 322, transit AMF 312-1 identifies, as shown at 348, that it is a transit AMF for the received N2 message and proxies the message to the home AMF 322, as shown at 350 for FIG. 3C. Thereafter, the registration between UE 302-1 and home AMF 322/the home mobile core network can be completed per standards-based registration procedures, as generally shown at 352, with transit AMF 312-1 proxying control plane communications between UE 302-1 and the home AMF 322 in accordance with embodiments herein.

Similar operations can be performed for UE 302-2. For example, upon recognizing PLMN-ID '333-334' being broadcast by the gNB 306, UE 302-2 can initiate registration with the home MNO/home mobile core network by transmitting a registration request message to the gNB 306 that includes the PLMN-ID '333-334' within an IMSI or SUCI/SUPI included in the registration request, as shown at 354. As shown at 356, gNB 306 identifies, based on the stored routing information, that transit AMF 312-2 is to provide interconnect services for UE 302-2/PLMN-ID '333-334' or, stated differently, that transit AMF 312-2 is to facilitate control plane proxy communications between UE 302-2 and home AMF 322 for PLMN-ID '333-334' by matching the PLMN-ID '333-334' presented by the UE 302-2 via the registration request to the corresponding PLMN-ID '333-334' stored in the routing information table 338 that identifies transit AMF 312-2 corresponding to the second transit MNO PLMN-ID of '222-222' as being the highest priority ('1') proxy/transit AMF to provide transit interconnect services for the PLMN-ID '333-334' indicated by UE 302-2. Based on the identification at 356, gNB 306 transmits the registration request to transit AMF 312-2, as shown at 358. Based on the routing information configured at transit AMF 312-2 via the registration procedure with home AMF 322, transit AMF 312-2 identifies, as shown at 360, that it is a transit AMF for the received N2 message and proxies the message to the home AMF 322, as shown at 362. Thereafter, the registration between UE 302-2 and home AMF 322/the home mobile core network can be completed per standards-based registration procedures, as generally shown at 364, with transit AMF 312-2 proxying control plane communications between UE 302-2 and the home AMF 322 in accordance with embodiments herein.

In some instances, a home AMF may become unreachable from a given transit AMF in which case the transit AMF can reject a control plane message received from a shared RAN, potentially including a cause code (e.g., network not available, etc.). Such a scenario is illustrated in FIG. 3D.

As home AMF 322 has registered with multiple transit AMFs for the embodiment of FIGS. 3A-3D, policies for N2 distribution are configured for the system via the priority values such that a backup or next highest priority (lower priority) transit AMF can be determined by the gNB for routing N2 packets for home AMF 322 upon the highest priority transit AMF that is currently proxying control plane communications for home AMF 322 becoming unavailable/unreachable.

Figure 3A:
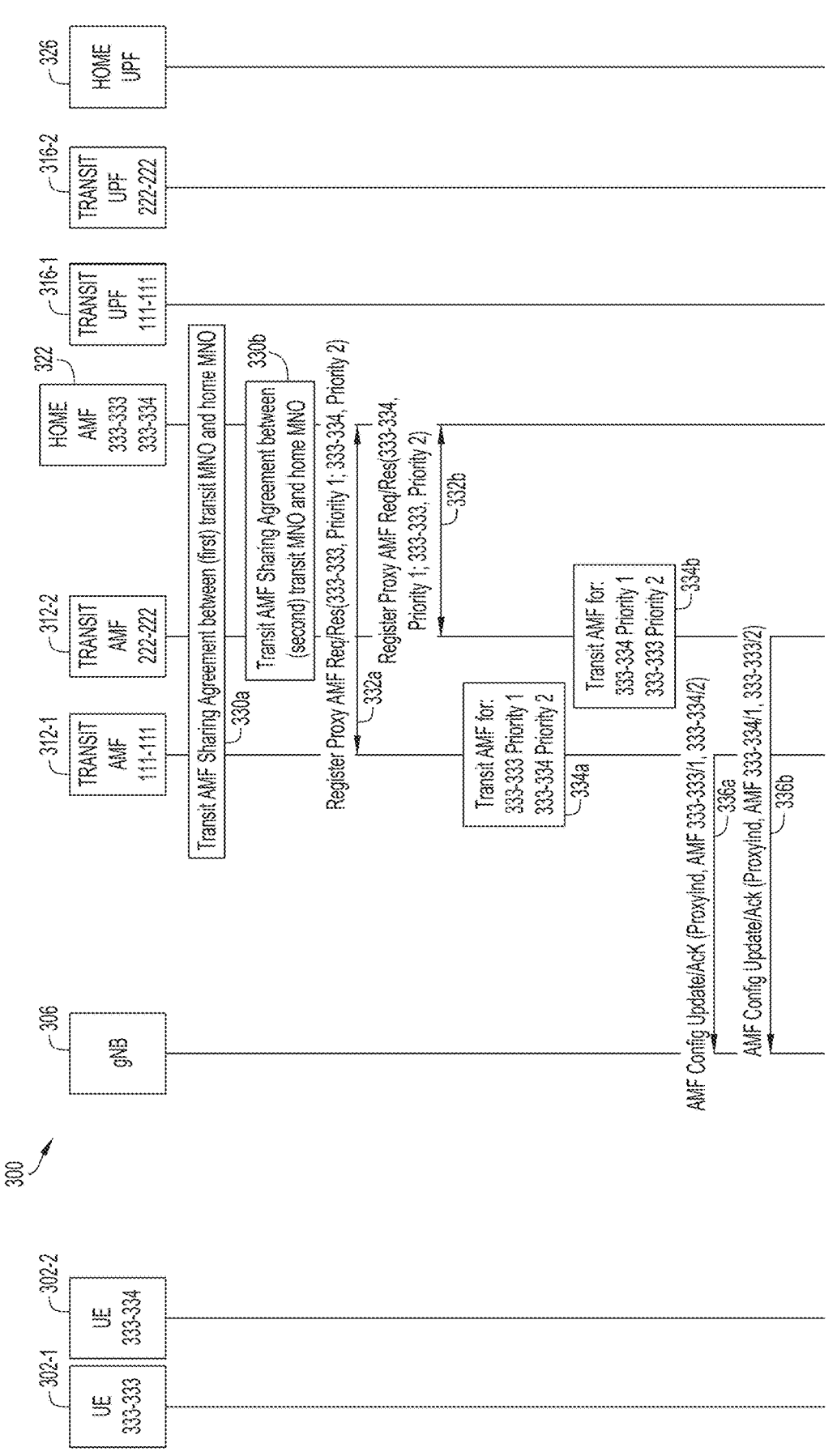
Figure 3C:
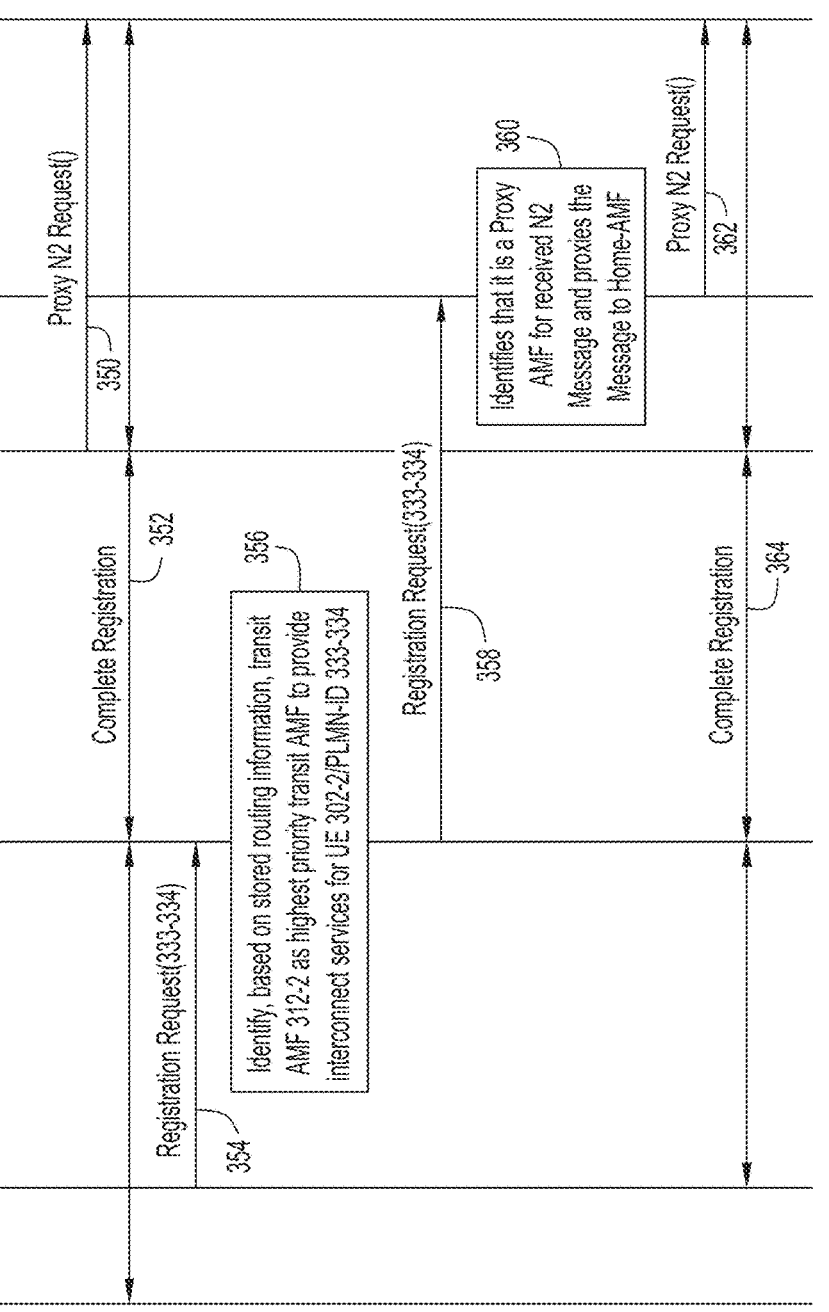
Figure 3D:
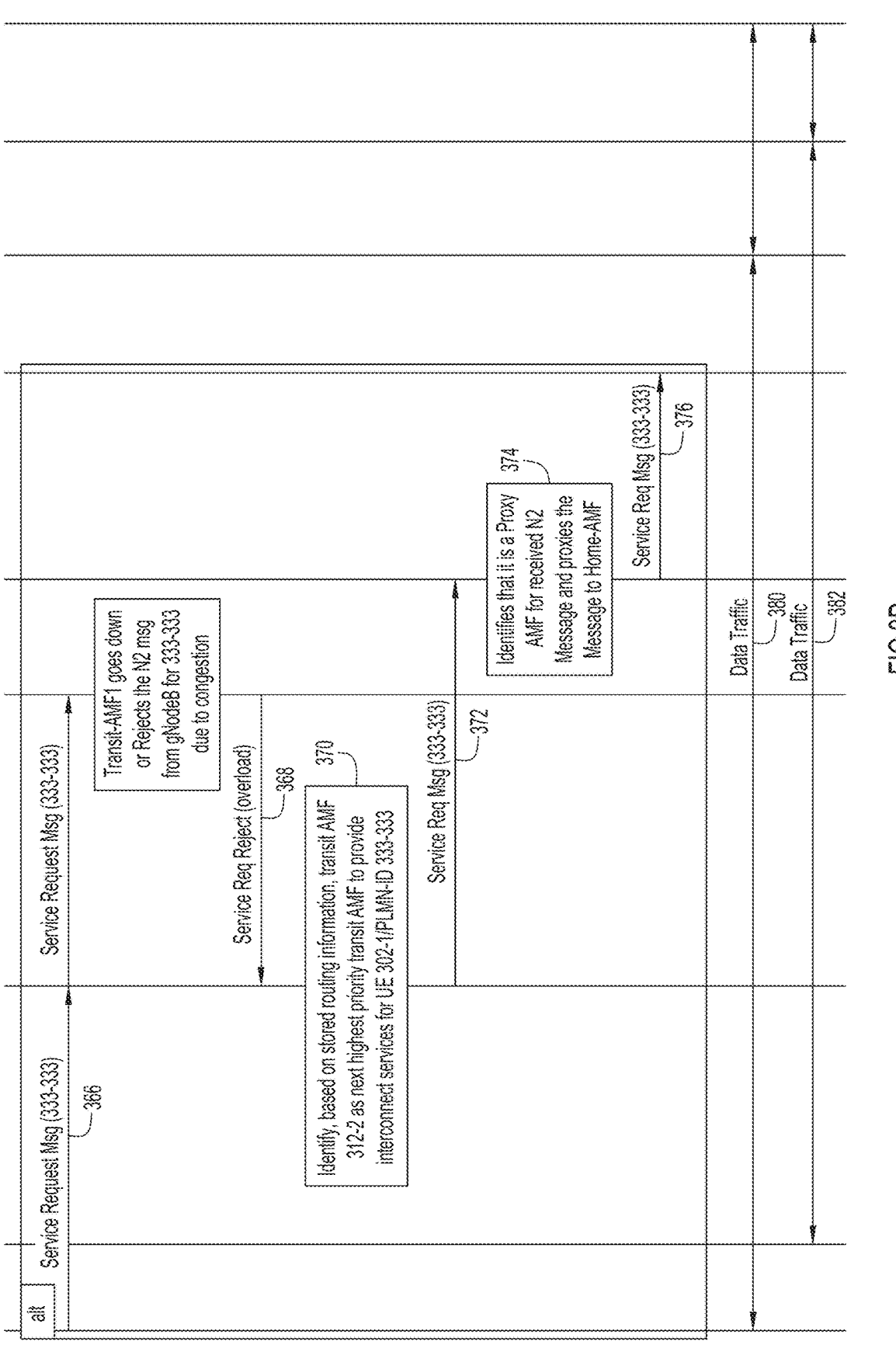

For example, consider at 366 as shown in FIG. 3D that UE 302-1 issues a service request message associated with PLMN-ID '333-333', which gNB 306 forwards to transit AMF 312-1 per the previous identification/priority identified by gNB 306, as discussed at 344. However, consider that transit AMF 312-1 goes down or rejects the N2 message for PLMN-ID '333-333' due to congestion, etc., such that transit AMF 312-1 rejects the service request with a cause code indicating that it is overloaded, as shown at 368.

Upon receiving the rejection, gNB 306 performs, at 370, a look-up on its stored PLMN-ID routing information to identify the next highest priority or lower priority/backup transit AMF that is to provide interconnect services for UE 302-1/PLMN-ID '333-333' in the event that the highest priority transit AMF goes down/becomes unreachable/rejects an N2 message, etc. by matching the PLMN-ID '333-

333' to the next highest priority AMF identified in the routing information table 338 such that transit AMF 312-2 for the second transit MNO '222-222', having a priority value of '2' is identified by gNB 306 as the next highest priority (or lower priority) transit AMF for PLMN-ID '333-333'. Thus, at 372, gNB 306 transmits the service request message to transit AMF 312-2, which identifies at 374, based on its routing information that it is a proxy for the received N2 message and proxies the message to home AMF 322, as shown at 376, in accordance with embodiments herein.

Other N2 transit policies, in addition to and/or in lieu of priority based policies, can be configured for a system in accordance with embodiments herein. For example, in some embodiments, load sharing policies can be configured for a gNB such that the gNB can distribute N2 packets for a home AMF between multiple transit AMFs based on load sharing criteria (e.g., 50-50, 30-70, round robin, etc.). In still some embodiments, redundancy policies can be configured for a gNB such that the gNB can send a copy of N2 packets to multiple transit AMFs that each forward the N2 packets to the same home AMF in which case the home AMF can eliminate or discard duplicate packets.

Further as shown at 380, data traffic for UE 302-1 can be proxied to home UPF 326 via transit UPF 316-1 and, as shown at 382, data traffic for UE 302-2 can be proxied to home UPF 326 via transit UPF 316-2.

Referring to FIG. 4, FIG. 4 is a flowchart depicting another method according to an example embodiment. In at least one embodiment, method 400 may be associated with techniques that may be utilized to facilitate RAN sharing for a MOCN environment, according to an example embodiment. In various embodiments, method 400 may be performed by a computing device or combination of computing devices as discussed for embodiments herein, such as at least gNB 306 or gNB 106.

As shown at 402, method 400 may include obtaining, by a radio node of a share RAN (e.g., gNB 306), a plurality of home mobile network identifiers (home PLMN-IDs) that are associated with a home AMF (e.g., home AMF 322) in which the plurality of home mobile network identifiers are obtained from a first transit AMF (e.g., transit AMF 312-1) that is associated with a first transit mobile network identifier in which each of the plurality of home mobile network identifiers obtained from the first transit AMF are assigned first priority values and are also obtained from a second transit AMF (e.g., transit AMF 312-2) that is associated with a second transit mobile network identifier in which each of the plurality of home mobile network identifiers obtained from the second transit AMF are assigned second priority values that are different than the first priority values.

At 404, the method includes obtaining, by the radio node of the shared RAN, a control plane communication from a UE in which the control plane communication includes a mobile network identifier indicating a mobile network associated with the UE (e.g., with which the UE has a mobile subscription, with which the UE is currently registered, etc.). For example, a registration request, a service request, etc. can include a PLMN-ID for the home mobile core network with which the UE seeks to register or is currently registered.

At 406, the method may include identifying, by the radio node of the shared RAN, a particular home mobile network identifier of the plurality of home mobile network identifiers that matches the mobile network identifier included in the control plane communication and one of the first transit AMF or the second transit AMF that is associated with a highest priority value of the first priority values and the second priority values for the particular home mobile network identifier.

At 408, the method may include transmitting, by the radio node of the shared RAN, the registration request to the first transit AMF or the second transit AMF based on the identifying in which the first transit AMF or the second transit AMF is to proxy control plane communications between the UE and the home AMF via an N2 connection with the home AMF.

Accordingly, embodiments herein facilitate RAN sharing for a MOCN environment in which one or more home mobile core networks/home AMFs and, in some instances, home UPFs may not have direct interconnections with a shared RAN/radio nodes of a shared RAN but rather one or more transit mobile core networks/transit AMFs and, in some instances, transit UPFs may have direct connections with the shared RAN/radio nodes of the shared RAN and may proxy control plane and, in some instances also user plane communications between UEs connected to the shared RAN and each of one or more home mobile core networks/network functions provided therein.

Figure 5:
FIG. 5 is a hardware block diagram of a computing device that may perform functions associated with any combination of operations discussed in connection with techniques described for embodiments herein.

Referring to FIG. 5, FIG. 5 illustrates a hardware block diagram of a computing device 500 that may perform functions associated with operations discussed herein in connection with the techniques depicted in FIGS. 1, 2, 3A, 3B, 3C, 3D and 4. In various embodiments, a computing device or apparatus, such as computing device 500 or any combination of computing devices 500, may be configured as any entity/entities as discussed for the techniques depicted in connection with operations illustrated/discussed for various embodiments herein, such as gNB 106, gNB 306, transit AMF 112, transit AMF 312-1, transit AMF 312-2, home AMF 122, home AMF 322, any UE discussed herein, and/or any other elements/functions/nodes discussed herein.

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein.

For embodiments in which computing device 500 may be implemented as any device capable of wireless communications (e.g., gNB 106, gNB 306, any UE, etc.), computing device 500 may further include at least one baseband processor or modem 510, one or more radio RF transceiver(s) 512 (e.g., any combination of RF receiver(s) and RF transmitter(s)), one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wirelessly) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 500 is implemented as a wireless device or any apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a radio node of a shared radio access network (RAN), a plurality of home mobile network identifiers that are associated with a home access and mobility management function (AMF), the plurality of home mobile network identifiers being obtained from: a first transit AMF that is associated with a first transit mobile network identifier, wherein each of the plurality of home mobile network identifiers obtained from the first transit AMF are assigned first priority values; and a second transit AMF that is associated with a second transit mobile network identifier, wherein each of the plurality of home mobile network identifiers obtained from the second transit AMF are assigned second priority values that are different than the first priority values; obtaining, by the radio node of the shared RAN, a control plane communication from a user equipment (UE), wherein the control plane communication includes a mobile network identifier indicating a mobile network associated with the user equipment; identifying, by the radio node of the shared RAN, a particular home mobile network identifier of the plurality of home mobile network identifiers that matches the mobile network identifier included in the control plane communication and one of the first transit AMF or the second transit AMF that is associated with a highest priority value of the first priority values and the second priority values for the particular home mobile network identifier; and transmitting, by the radio node of the shared RAN, the control plane communication to the first transit AMF or the second transit AMF based on the identifying, wherein the first transit AMF or the second transit AMF is to proxy control plane communications between the UE and the home AMF.

In one instance, the method may include storing, by the radio node of the shared RAN, the plurality of home mobile network identifiers and the first priority values obtained from the first transit AMF in association with the first transit mobile network identifier that is associated with the first transit AMF; and storing, by the radio node of the shared RAN, the plurality of home mobile network identifiers and the second priority values obtained from the second transit AMF in association with the second transit mobile network identifier that is associated with the second transit AMF.

In one instance, the method may include obtaining, by the first transit AMF, the plurality of home mobile network identifiers and the first priority values assigned to the plurality of home mobile network identifiers via a first registration procedure performed between the first transit AMF and the home AMF; and obtaining, by the second transit AMF, the plurality of home mobile network identifiers and the second priority values assigned to the plurality of home mobile network identifiers via a second registration procedure performed between the second transit AMF and the home AMF.

For the method, the home AMF does not have a direct connection with the radio node of the shared RAN. In one instance, the first transit AMF is operated by a first transit mobile network operator and the second AMF is operated by a second transit mobile network operator that is different than the first transit mobile network operator. In one instance, the home AMF is operated by a home mobile network operator that is different from both the first transit mobile network operator and the second transit mobile network operator.

Each of the first transit AMF and the second transit AMF facilitate a corresponding Third Generation Partnership Project (3GPP) N2 connection and a corresponding 3GPP N14 connection with the home AMF.

In one instance, the identifying further includes identifying that the first transit AMF or the second transit AMF that is associated with the highest priority value of the first priority values and the second priority values for the particular home mobile network identifier is unreachable or has rejected the control plane communication; identifying the other of the first transit AMF or the second transit AMF that is associated with the next highest priority value of the first priority values and the second priority values for the particular home mobile network identifier; and transmitting the control plane communication to the other of the first transit AMF or the second transit AMF.

Accordingly, embodiments herein provide for an AMF to support new capabilities/functionality in the form of transit AMF services for one or more PLMN-IDs. Further, embodiments herein facilitate configurations in home AMF(s) in home mobile core network(s), gNB(s) in a shared RAN, and transit AMF(s) in transit mobile core network(s) for enabling such capabilities/functionality. Further, embodiments herein facilitate a home AMF assigning priorities for each of one or more serving transit AMFs on a per-PLMN basis, based on load, etc. Additionally, embodiments herein facilitate a transit AMF advertising to a gNB as an explicit proxy, along with PLMN-ID(s) of home AMF(s) and/or priority values and/or other N2 routing policies. Further, embodiments herein facilitate a gNB selecting a preferred transit network/ transit AMF based on the advertised priorities/policies. Additionally, embodiments herein facilitate a transit AMF terminating an N2 connection from a gNB and binding it with an N2 connection to a home AMF. Still further, embodiments herein facilitate an AMF in a transit network offering transit interconnect services to some PLMN-IDs (e.g., PLMN-ID(s) configured for home networks) and non-transit AMF services for other PLMN-IDs (e.g., PLMN-IDs configured for the transit network in which the AMF is provided).

Accordingly, various messaging elements, interactions, operations, etc. are provided in accordance with embodiments herein that can facilitate a new sharing model through which RAN sharing for a MOCN environment can be realized.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of, 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, by a radio node of a shared radio access network (RAN), a plurality of home mobile network identifiers that are associated with a home access and mobility management function (AMF), the plurality of home mobile network identifiers being obtained from:

a first transit AMF that is associated with a first transit mobile network identifier, wherein each of the plurality of home mobile network identifiers obtained from the first transit AMF are assigned first priority values; and a second transit AMF that is associated with a second transit mobile network identifier, wherein each of the plurality of home mobile network identifiers obtained from the second transit AMF are assigned second priority values that are different than the first priority values;

obtaining, by the radio node of the shared RAN, a control plane communication from a user equipment (UE), wherein the control plane communication includes a mobile network identifier indicating a mobile network associated with the user equipment;

identifying, by the radio node of the shared RAN, a particular home mobile network identifier of the plurality of home mobile network identifiers that matches the mobile network identifier included in the control plane communication and one of the first transit AMF or the second transit AMF that is associated with a highest priority value of the first priority values and the second priority values for the particular home mobile network identifier; and transmitting, by the radio node of the shared RAN, the control plane communication to the first transit AMF or the second transit AMF based on the identifying, wherein the first transit AMF or the second transit AMF is to proxy control plane communications between the UE and the home AMF.

2. The method of claim 1, further comprising:

storing, by the radio node of the shared RAN, the plurality of home mobile network identifiers and the first priority values obtained from the first transit AMF in association with the first transit mobile network identifier that is associated with the first transit AMF; and storing, by the radio node of the shared RAN, the plurality of home mobile network identifiers and the second priority values obtained from the second transit AMF in association with the second transit mobile network identifier that is associated with the second transit AMF.

3. The method of claim 1, further comprising:

obtaining, by the first transit AMF, the plurality of home mobile network identifiers and the first priority values assigned to the plurality of home mobile network identifiers via a first registration procedure performed between the first transit AMF and the home AMF; and obtaining, by the second transit AMF, the plurality of home mobile network identifiers and the second priority values assigned to the plurality of home mobile network identifiers via a second registration procedure performed between the second transit AMF and the home AMF.

4. The method of claim 1, wherein the home AMF does not have a direct connection with the radio node of the shared RAN.

5. The method of claim 1, wherein the first transit AMF is operated by a first transit mobile network operator and the second AMF is operated by a second transit mobile network operator that is different than the first transit mobile network operator.

6. The method of claim 5, wherein the home AMF is operated by a home mobile network operator that is different from both the first transit mobile network operator and the second transit mobile network operator.

7. The method of claim 1, wherein each of the first transit AMF and the second transit AMF facilitate a corresponding Third Generation Partnership Project (3GPP) N2 connection and a corresponding 3GPP N14 connection with the home AMF.

8. The method of claim 1, wherein the identifying further includes:

identifying that the first transit AMF or the second transit AMF that is associated with the highest priority value of the first priority values and the second priority values for the particular home mobile network identifier is unreachable or has rejected the control plane communication;

identifying an other of the first transit AMF or the second transit AMF that is associated with a next highest priority value of the first priority values and the second priority values for the particular home mobile network identifier; and transmitting the control plane communication to the other of the first transit AMF or the second transit AMF.

9. One or more non-transitory computer readable storage media encoded with instructions that, when executed by a processor, cause the processor to perform operations, comprising:

obtaining, by a radio node of a shared radio access network (RAN), a plurality of home mobile network identifiers that are associated with a home access and mobility management function (AMF), the plurality of home mobile network identifiers being obtained from:

a first transit AMF that is associated with a first transit mobile network identifier, wherein each of the plurality of home mobile network identifiers obtained from the first transit AMF are assigned first priority values; and a second transit AMF that is associated with a second transit mobile network identifier, wherein each of the plurality of home mobile network identifiers obtained from the second transit AMF are assigned second priority values that are different than the first priority values;

obtaining, by the radio node of the shared RAN, a control plane communication from a user equipment (UE), wherein the control plane communication includes a mobile network identifier indicating a mobile network associated with the user equipment;

identifying, by the radio node of the shared RAN, a particular home mobile network identifier of the plurality of home mobile network identifiers that matches the mobile network identifier included in the control plane communication and one of the first transit AMF or the second transit AMF that is associated with a highest priority value of the first priority values and the second priority values for the particular home mobile network identifier; and transmitting, by the radio node of the shared RAN, the control plane communication to the first transit AMF or the second transit AMF based on the identifying, wherein the first transit AMF or the second transit AMF is to proxy control plane communications between the UE and the home AMF.

10. The media of claim 9, wherein the instructions, when executed by the processor, cause the processor to perform further operations, comprising:

storing, by the radio node of the shared RAN, the plurality of home mobile network identifiers and the first priority values obtained from the first transit AMF in association with the first transit mobile network identifier that is associated with the first transit AMF; and storing, by the radio node of the shared RAN, the plurality of home mobile network identifiers and the second priority values obtained from the second transit AMF in association with the second transit mobile network identifier that is associated with the second transit AMF.

11. The media of claim 9, wherein the instructions, when executed by the processor, cause the processor to perform further operations, comprising:

obtaining, by the first transit AMF, the plurality of home mobile network identifiers and the first priority values assigned to the plurality of home mobile network identifiers via a first registration procedure performed between the first transit AMF and the home AMF; and obtaining, by the second transit AMF, the plurality of home mobile network identifiers and the second priority values assigned to the plurality of home mobile network identifiers via a second registration procedure performed between the second transit AMF and the home AMF.

12. The media of claim 9, wherein the first transit AMF is operated by a first transit mobile network operator and the second AMF is operated by a second transit mobile network operator that is different than the first transit mobile network operator.

13. The media of claim 9, wherein each of the first transit AMF and the second transit AMF facilitate a corresponding Third Generation Partnership Project (3GPP) N2 connection and a corresponding 3GPP N14 connection with the home AMF.

14. The media of claim 9, wherein the identifying further includes:

identifying that the first transit AMF or the second transit AMF that is associated with the highest priority value of the first priority values and the second priority values for the particular home mobile network identifier is unreachable or has rejected the control plane communication;

identifying an other of the first transit AMF or the second transit AMF that is associated with a next highest priority value of the first priority values and the second priority values for the particular home mobile network identifier; and transmitting the control plane communication to the other of the first transit AMF or the second transit AMF.

15. A system comprising:

at least one memory element for storing data; and at least one processor for executing instructions associated with the data, wherein executing the instructions causes the system to perform operations, comprising:

obtaining, by a radio node of a shared radio access network (RAN), a plurality of home mobile network identifiers that are associated with a home access and mobility management function (AMF), the plurality of home mobile network identifiers being obtained from:

a first transit AMF that is associated with a first transit mobile network identifier, wherein each of the plurality of home mobile network identifiers obtained from the first transit AMF are assigned first priority values; and a second transit AMF that is associated with a second transit mobile network identifier, wherein each of the plurality of home mobile network identifiers obtained from the second transit AMF are assigned second priority values that are different than the first priority values;

obtaining, by the radio node of the shared RAN, a control plane communication from a user equipment (UE), wherein the control plane communication includes a mobile network identifier indicating a mobile network associated with the user equipment;

identifying, by the radio node of the shared RAN, a particular home mobile network identifier of the plurality of home mobile network identifiers that matches the mobile network identifier included in the control plane communication and one of the first transit AMF or the second transit AMF that is associated with a highest priority value of the first priority values and the second priority values for the particular home mobile network identifier; and transmitting, by the radio node of the shared RAN, the control plane communication to the first transit AMF or the second transit AMF based on the identifying, wherein the first transit AMF or the second transit AMF is to proxy control plane communications between the UE and the home AMF.

16. The system of claim 15, wherein executing the instructions causes the system to perform further operations, comprising:

storing, by the radio node of the shared RAN, the plurality of home mobile network identifiers and the first priority values obtained from the first transit AMF in association with the first transit mobile network identifier that is associated with the first transit AMF; and storing, by the radio node of the shared RAN, the plurality of home mobile network identifiers and the second priority values obtained from the second transit AMF in association with the second transit mobile network identifier that is associated with the second transit AMF.

17. The system of claim 15, wherein the instructions, when executed by the processor, cause the processor to perform further operations, comprising:

obtaining, by the first transit AMF, the plurality of home mobile network identifiers and the first priority values assigned to the plurality of home mobile network identifiers via a first registration procedure performed between the first transit AMF and the home AMF; and obtaining, by the second transit AMF, the plurality of home mobile network identifiers and the second priority values assigned to the plurality of home mobile network identifiers via a second registration procedure performed between the second transit AMF and the home AMF.

18. The system of claim 15, wherein the first transit AMF is operated by a first transit mobile network operator and the second AMF is operated by a second transit mobile network operator that is different than the first transit mobile network operator, and the home AMF is operated by a home mobile network operator that is different from both the first transit mobile network operator and the second transit mobile network operator.

19. The system of claim 15, wherein each of the first transit AMF and the second transit AMF facilitate a corresponding Third Generation Partnership Project (3GPP) N2 connection and a corresponding 3GPP N14 connection with the home AMF.

20. The system of claim 15, wherein the identifying further includes:

identifying that the first transit AMF or the second transit AMF that is associated with the highest priority value of the first priority values and the second priority values for the particular home mobile network identifier is unreachable or has rejected the control plane communication;

identifying an other of the first transit AMF or the second transit AMF that is associated with a next highest priority value of the first priority values and the second priority values for the particular home mobile network identifier; and transmitting the control plane communication to the other of the first transit AMF or the second transit AMF.

* * * * *